(No Model.)
H. S. SCHAADT & F. L. CLARK.
WELT TRIMMING MACHINE.
No. 429,065. Patented May 27, 1890.
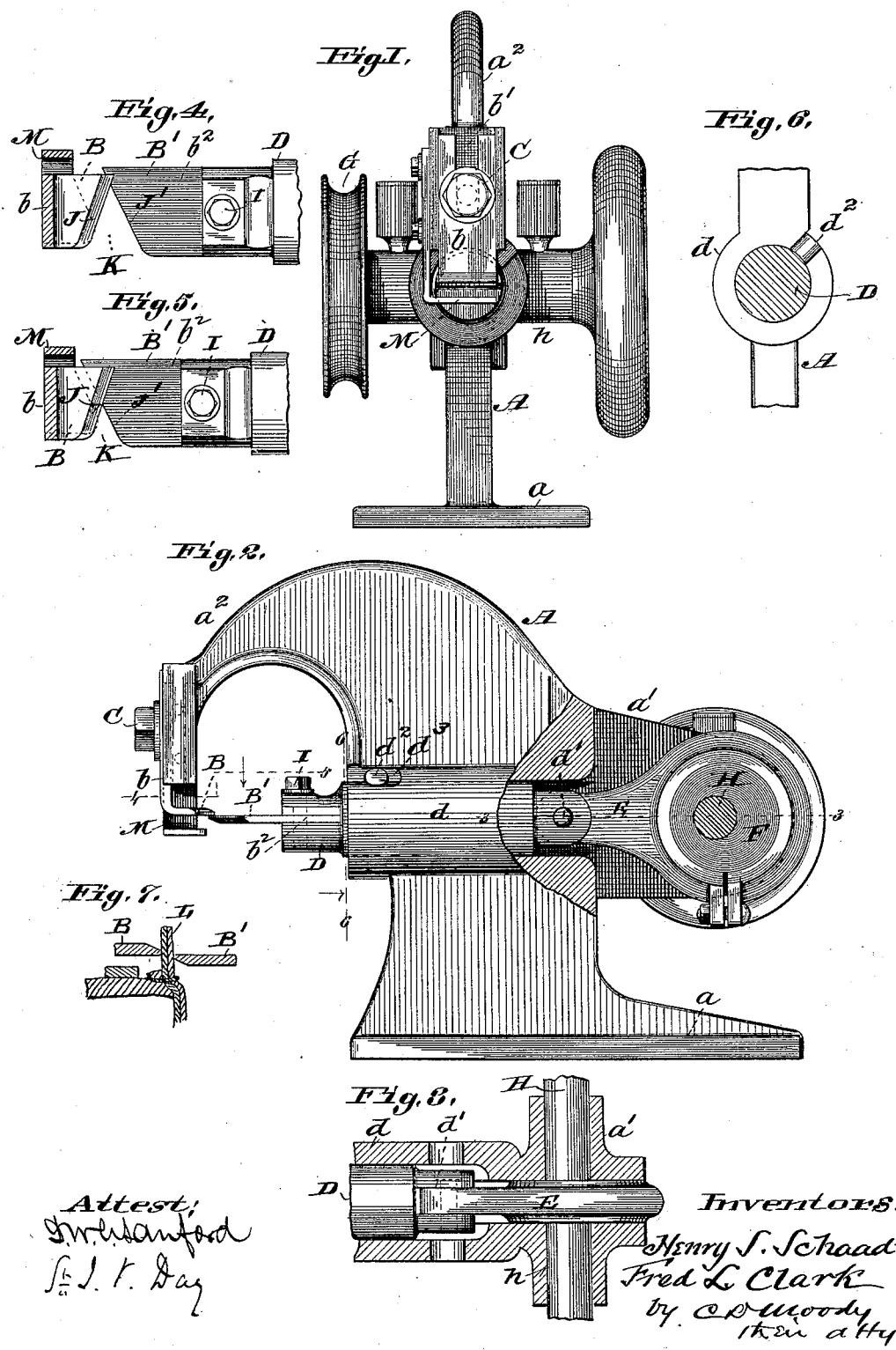

UNITED STATES PATENT OFFICE.

HENRY S. SCHAADT AND FRED L. CLARK, OF ST. LOUIS, MISSOURI.

WELT-TRIMMING MACHINE.

SPECIFICATION forming part of Letters Patent No. 429,065, dated May 27, 1890.

Application filed August 29, 1889. Serial No. 322,339. (No model.)

*To all whom it may concern:*

Be it known that we, HENRY S. SCHAADT and FRED L. CLARK, of St. Louis, Missouri, have jointly made a new and useful Improvement in Shoe Welt and Upper Trimming Machines, of which the following is a full, clear, and exact description.

The leading feature of the present improved machine is a pair of shears so shaped and relatively arranged and coacting in such a manner as to provide both for guiding the work and keeping it in position to be operated upon and also for effecting the desired trimming. The machine is also so constructed that the shoe can be conveniently presented to the shears and turned around while in contact with the shears, and the operation of trimming a welt or upper rendered continuous, substantially as is hereinafter set forth and claimed, aided by the annexed drawings, making part of this specification, in which—

Figure 1 is a front elevation of the improved machine; Fig. 2, a side elevation of the machine, a portion of the upright being broken away to exhibit the interior construction; Fig. 3, a horizontal section on the line 3 3 of Fig. 2, the movable parts being shown in plan view; Figs. 4 and 5, horizontal sections on the line 4 5 of Fig. 2, and respectively showing the two extreme positions of the movable shear; Fig. 6, a vertical section on the line 6 6 of Fig. 2, and Fig. 7 a vertical section, showing the position of the work while being trimmed.

The same letters of reference denote the same parts.

The frame of the machine is mainly an upright A, having a suitable foot $a$, a rearwardly-projecting extension $a'$, and a forwardly-overhanging arm $a^2$.

B B' represent the pair of shears. The stationary shear B is supported from the arm $a^2$, the shear having an upturned arm $b$, which, by means of the bolt C, is secured to the arm $a^2$.

To provide for adjusting the shear B with reference to the other shear B' the arm $b$ is slotted at $b'$, enabling the arm $b$ to be adjusted upward and downward upon the arm $a^2$, as may be desired, for the purpose named.

The shear B' is movable toward and from the shear B. The direction and extent of the movement are shown by the two positions of the shear B'. (Shown, respectively, in Figs. 4 and 5.)

The shear B' is fastened to the slide-rod D, which is adapted to be moved forward and backward in its bearing $d$ in the upright A, and the shear B' thereby caused to close upon and open apart from the shear B, as shown. The slide-rod D is jointed at $d'$ to the eccentric-strap E, which encircles the eccentric F.

Motion is imparted to the shear B' by means of a belt (not shown) leading to the pulley G, which is attached to the shaft H, which carries the eccentric F. The shaft H is journaled at $h$ in the upright extension $a'$.

The slide-rod D is preferably round, and to prevent any tendency it may have to turn in its bearing, and thereby cause the shear B' to bind upon the shear B, the slide-rod is provided with a guide-pin $d^2$, Figs. 2 and 6, which works in a slot $d^3$ in the bearing $d$, and thereby serves to prevent the slide-rod from rotating, as described. The slide-rod at its outer end is split to admit the arm $b^2$ of the shear B', and by means of the screw-bolt I the two parts of the slide-rod are clamped upon the arm $b^2$, so as to properly hold the shear B'.

The shears and their operation, more particularly described, are as follows: The cutting-edges J and J' of the shears B B', respectively, are inclined in opposite directions to each other, as shown, and the movement of the shear B' with relation to the shear B is such that the shear B' in closing upon the shear B does not move far enough to lap upon the shear B throughout its entire width, nor in opening apart from the shear B does it move far enough to cause the cutting-edges J J' to become entirely separated from each other. Hence in all positions of the shear B' there is always a V-shaped opening K to admit the welt or upper L, Fig. 7, between a portion of the cutting-edges and at the same time a shoulder to prevent the welt or upper from passing entirely beyond the cutting-edges. By this means that portion of the cutting-edges between which the welt or upper is entered becomes a guide to direct the welt or upper edge into position to be acted upon by the shears. The movable shear in practice is driven at a high rate—say, one thousand strokes a minute—so high a rate in fact that the operator in manipulating the shoe to present the welt or upper to the shears cannot well feed the work faster than the forward movement of the shear B', and the feeding of the work may therefore be said to be practically continuous, and so rapid that an operator, with the aid of the present machine, can trim as many shoes as several operators can by hand.

M represents a gage vertically adjustable upon the arm $a^2$, by means of which the width of the edge trimmed is regulated.

We desire not to be restricted to a stationary shear B in carrying out this improvement, for it is possible to obtain the herein-described relative arrangement and coaction of the shears even when both of them are movable.

By reason of the overhanging arm of the upright and the described relative arrangement of the shears provision is made whereby a shoe having a welt or upper to be trimmed can be readily manipulated to present all parts of the welt or upper edge to the shears.

We claim—

1. The frame consisting mainly of the upright A, the shears B B', the former supported from the overhanging arm $a^2$ of the frame and capable of being adjusted, as described, and the latter attached to the slide-rod D, movable forward and backward in bearings in the frame and jointed to the strap E, which encircles the eccentric F, and the shaft H, all combined in the manner and for the purposes set forth.

2. In a shoe welt or upper trimming machine, the combination of the upright having the overhanging arm, the stationary shear and the movable shear, said stationary shear being attached to said overhanging arm by means of its arm and a bolt passing through it, and said movable shear being attached to a rod working in said upright, and said shears being shaped, relatively arranged, and coacting to guide and trim the work, as described.

Witness our hands this 27th day of August, 1889.

HENRY S. SCHAADT.
  FRED L. CLARK.

Witnesses:
 C. D. MOODY,
 D. W. A. SANFORD.